E. P. ALLEN.
VALVE.
APPLICATION FILED SEPT. 19, 1903.
945,433.
Patented Jan. 4, 1910.
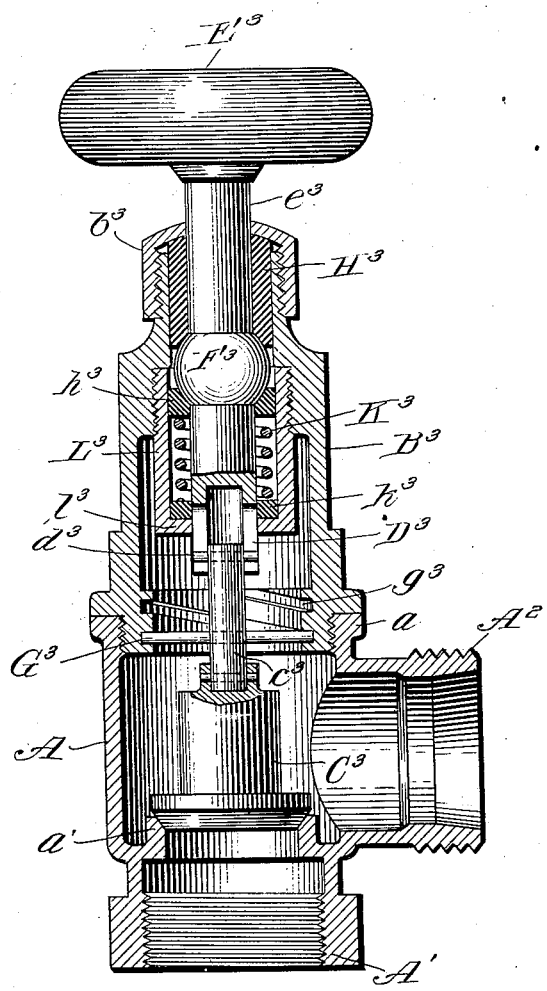

UNITED STATES PATENT OFFICE.

EVERETT P. ALLEN, OF CHICAGO, ILLINOIS, ASSIGNOR TO NORWALL MANUFACTURING COMPANY, OF CHICAGO, ILLINOIS.

VALVE.

945,433.  Specification of Letters Patent.  Patented Jan. 4, 1910.

Application filed September 19, 1903. Serial No. 173,756.

*To all whom it may concern:*

Be it known that I, EVERETT P. ALLEN, a citizen of the United States, residing at Chicago, county of Cook, State of Illinois, have invented a certain new and useful Improvement in Valves, and declare the following to be a full, clear, and exact description of the same, such as will enable others skilled in the art to which it pertains to make and use the same, reference being had to the accompanying drawings, which form a part of this specification.

My invention relates in general to valves for controlling the flow of a fluid through a conduit, and more particularly to valves used in heating systems for connecting and disconnecting a radiator with the supply of the heating medium.

It is customary in steam and hot water heating systems to provide hand operated valves for permitting the heating medium to flow into the radiator or for cutting off the radiator from the heating medium when the desired temperature of the room has been attained. Considerable difficulty has been heretofore experienced in rendering the valve casing through which the valve operating stem extends so tight that the escape of fluid from the system will be prevented. Packing has heretofore been necessary to close the opening in the casing through which the valve operating stem extends.

The primary object of my invention is to provide a valve for controlling the flow of fluid through a conduit which requires no packing in order to render the same proof against leakage.

A further object of my invention is to provide a valve for controlling the communication of a radiator with a steam heating system which will be comparatively simple in construction, inexpensive in manufacture, and efficient and durable in use.

My invention, generally described, consists in a valve casing, a valve seat within said casing, a valve adapted to engage and disengage the valve seat, a rod or lever for operating the valve extending from the exterior to the interior of the casing and longitudinally immovable with respect thereto, an enlargement rigidly secured to the rod or lever within the casing, a surface carried by the valve casing and surrounding said rod or lever against which said enlargement at all times tightly engages.

The drawing is a central longitudinal section of a valve arranged in accordance with a preferred form of my invention.

Similar reference characters are used to designate similar parts in the drawing.

Reference letter A designates the valve casing which is interposed in a conduit in which water, steam or other fluid is adapted to flow.

A' indicates an interiorly screw threaded coupling adapted to be united to the portion of the conduit from which the fluid flows, while $A^2$ indicates an exteriorly screw threaded coupling adapted to be connected to a conduit into which the fluid flows when the valve is unseated. When the valve is used for controlling the flow of a heating medium to a radiator the coupling $A^2$ is united to the radiator.

$B^3$ designates a cap in screw threaded engagement with the valve casing at $a$ and through which the stem $e^3$ for operating the valve extends.

$E^3$ indicates a disk or other handle rigidly fixed to the end of the stem $e^3$ for actuating the valve.

$C^3$ designates a valve located within the casing and adapted to engage with the valve seat $a^1$. The valve $C^3$ is rigidly connected to a short rod $c^3$ which is provided with a pin $G^3$ extending through the same and into engagement with a spiral groove $g^3$ formed on the interior of the cap $B^3$. The end of the rod $c^3$ opposite to the valve $C^3$ is provided with a transverse pin $d^3$ which is received within longitudinal slots $D^3$ formed in the opposite walls of the lower hollow end of the valve stem $e^3$.

The construction above described and illustrated forms no part of my invention and its operation need not be further described than to state that a rotation of the handle or disk $E^3$ in either direction rotates the rod $c^3$ and with the rod the valve $C^3$. When the valve stem $e^3$ is rotated in one direction the pin $G^3$ through its engagement with the spiral groove $g^3$, lifts the valve away from its seat, while the rotation of the valve stem $e^3$ in an opposite direction forces the valve $C^3$ against the valve seat $a^1$ by means of the coöperating rod $G^3$ and spiral groove $g^3$.

The application of my invention to the valve construction above described is effected by forming an enlargement $F^3$ upon the valve stem $e^3$ which is forced into engagement with the lower end of a sleeve $H^3$ surrounding the valve stem and interposed between the enlargement $F^3$ and the thimble $b^3$. The enlargement $F^3$ is forcibly retained in contact with the lower end of the sleeve $H^3$ by means of a spring $K^3$ which surrounds the valve stem below the enlargement thereon and bears at its upper end upon a washer $h^3$ and at its lower end upon a ring $k^3$ supported against downward movement by means of the inturned flange $l^3$ formed at the lower end of the tube $L^3$ which in turn is screwed into the cap $B^3$ so as to make the flange $l^3$ an adjustable shoulder for supporting the stem.

In the embodiment of my invention above described it will be noticed that the valve is seated and unseated by the rotary movement of a valve stem, such stem being at all times longitudinally immovable with respect to the cap of the valve casing through which it extends. By providing the enlargement, which is spherical, on the valve stem and coöperating seat within the valve casing cap, an air and fluid tight casing is made.

From the foregoing description it will be observed that I have invented means for rendering a radiator or other valve air, steam, and water-tight without the use of gaskets or other form of packing, thereby preventing leakage of a fluid from the valve casing around the valve actuating steam and also preventing the admission of air into the valve casing when the pressure therein is below that of the atmosphere.

While I have described more or less precisely the details of construction, I do not wish to be understood as limiting myself thereto, as I contemplate changes in form, the proportion of parts, and the substitution of equivalents, as circumstances may suggest or render expedient, without departing from the spirit of my invention.

Having now fully described my invention, what I claim as new, and desire to secure by Letters Patent, is—

1. The combination with a valve casing, of a valve seat therein, a valve coöperating with said valve seat, a rotary valve stem extending through said valve casing from the exterior thereof but axially immovable with respect thereto, a sleeve closely surrounding said stem and interposed between the same and the casing, a circular enlargement carried by said stem, a circular shoulder formed at the inner end of said sleeve against which said enlargement engages, a tube supported within said casing below said sleeve, a washer within said tube surrounding said valve stem on the opposite side thereof from said shoulder, a spring within said tube surrounding said valve stem the tension of which is exerted upon said washer to retain said enlargement in close contact with such shoulder.

2. The combination with a valve casing having a valve seat therein, of a valve coöperating with said seat, a rotary valve stem extending into said valve casing from the exterior thereof but axially immovable therein, an annular enlargement on said stem at a point within said casing, a movable member within said casing and surrounding the stem at a point beneath said enlargement, an adjustable shoulder carried by said casing beneath said member, a spring arranged between said member and said shoulder, a sleeve surrounding said stem above said enlargement, and an adjustable cap on said casing engaging the outer end of said sleeve to hold the inner end of said sleeve against enlargement.

In testimony whereof, I sign this specification in the presence of two witnesses.

EVERETT P. ALLEN.

Witnesses:
GEO. L. WILKINSON,
CLARA C. CUNNINGHAM.